United States Patent
Gwak et al.

(10) Patent No.: US 9,477,296 B2
(45) Date of Patent: Oct. 25, 2016

(54) APPARATUS AND METHOD FOR CONTROLLING POWER OF ELECTRONIC DEVICE HAVING MULTI-CORE

(71) Applicant: Samsung Electronics Co., Ltd., Gyeonggi-do (KR)

(72) Inventors: Taehee Gwak, Gyeonggi-do (KR); Hyungrok Kim, Seoul (KR); Youngtaek Kim, Seoul (KR); Eunji Lee, Seoul (KR); Kangtae Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 325 days.

(21) Appl. No.: 13/774,256

(22) Filed: Feb. 22, 2013

(65) Prior Publication Data
US 2013/0227326 A1   Aug. 29, 2013

(30) Foreign Application Priority Data

Feb. 24, 2012  (KR) .......................... 10-2012-0019215

(51) Int. Cl.
*G06F 1/26* (2006.01)
*G06F 1/32* (2006.01)

(52) U.S. Cl.
CPC .......... *G06F 1/3287* (2013.01); *Y02B 60/1282* (2013.01); *Y02B 60/32* (2013.01)

(58) Field of Classification Search
CPC ........ G06F 1/32; G06F 1/3287; G06F 9/505; G06F 1/329; Y02B 60/32; Y02B 60/1282; Y02B 60/1203; Y02B 60/144; Y02B 60/148
See application file for complete search history.

(56) References Cited

U.S. PATENT DOCUMENTS

| | | | |
|---|---|---|---|
| 7,093,147 B2* | 8/2006 | Farkas | G06F 1/3203 713/320 |
| 8,122,269 B2* | 2/2012 | Houlihan | G06F 1/3215 712/1 |
| 8,775,830 B2* | 7/2014 | Sur et al. | 713/300 |
| 8,880,924 B2* | 11/2014 | Ko | G06F 1/3206 713/320 |
| 2006/0090161 A1* | 4/2006 | Bodas | G06F 9/5044 718/100 |
| 2008/0288748 A1* | 11/2008 | Sutardja | G06F 1/3203 712/20 |
| 2009/0328055 A1* | 12/2009 | Bose et al. | 718/105 |
| 2010/0174923 A1* | 7/2010 | Houlihan et al. | 713/300 |
| 2010/0293358 A1* | 11/2010 | Sakaguchi et al. | 712/223 |
| 2012/0216054 A1 | 8/2012 | Cho et al. | |

FOREIGN PATENT DOCUMENTS

KR   1020110049409    5/2011

* cited by examiner

*Primary Examiner* — Fahmida Rahman
(74) *Attorney, Agent, or Firm* — The Farrell Law Firm, P.C.

(57) ABSTRACT

A method of controlling on/off of a core based on a used amount of an operating core and the number of tasks in an electronic device having a multi-core, and an apparatus thereof, includes confirming a load of an operating core and the number of executable tasks at a predetermined period, determining whether the load of the operating core and the number of executable tasks meet a defined on/off condition of the multi-core, and controlling on/off of the multi-core when the load of the operating core and the number of executable tasks meet the defined on/off condition of the multi-core.

18 Claims, 9 Drawing Sheets

APPARATUS AND METHOD FOR CONTROLLING POWER OF ELECTRONIC DEVICE HAVING MULTI-CORE

PRIORITY

This application claims priority under 35 U.S.C. §119(a) to a Korean patent application filed on Feb. 24, 2012 in the Korean Intellectual Property Office and assigned Ser. No. 10-2012-0019215, the entire disclosure of which is hereby incorporated by reference.

BACKGROUND OF THE INVENTION

1. Field of the Invention

The present invention relates generally to a method and an apparatus for controlling power of an electronic device, and more particularly, to a method of controlling on/off of a core based on a used amount of a core and the number of tasks in an electronic device having a multi-core, and an apparatus thereof.

2. Description of the Related Art

With the significant development of information, communication and semiconductor technologies, the supply and use of portable terminals have rapidly increased. The portable terminal provides various functions such as a call function, a music playback function, a character message transmission/reception function, a digital broadcasting/receiving function, a near field wireless communication function, and an Internet connection function. A user may install various additional applications in a portable terminal.

To provision the various functions in a mobile terminal, a portable terminal using a multi-core instead of a single-core has been recently developed. A portable terminal using a multi-core has a faster processing speed but also a greater power consumption. That is, the portable terminal including the multi-core reacts with great sensitivity in power consumption. Because the size of a battery is restricted in a compact portable terminal, power consumption in the portable terminal having a multi-core is an important issue.

Accordingly, there is a need for a low power consumption design, for reducing power consumption of the multi-core while easily providing various applications in the portable terminal including the multi-core. However, the existing low power scheme applied to the multi-core environment to minimize power consumption of a multi-core processor is limited. Accordingly, there is a demand to correct and compensate the existing low power scheme to adequately meet the multi-core environment requirements.

SUMMARY OF THE INVENTION

Accordingly, the present invention has been made in view of the above problems and/or disadvantages, and the present invention provides a method of controlling power of an electronic device having a multi-core capable of reducing current consumption by turning on/off at least one core according to a load of the core and the number of executable tasks, and an apparatus thereof.

An aspect of the present invention provides a method of controlling power of an electronic device, which includes a multi-core capable of reducing current consumption by setting a plurality of on/off reference values of the multi-core in consideration of current consumption characteristics of a multi-core processor.

An aspect of the present invention, provides a method of controlling power of an electronic device, which includes a multi-core which prevents overhead due to generation of frequent core on/off from being generated by determining whether an operation frequency of a core is greater than or equal to a reference value when on/off of the core is requested to control on/off of the core.

According to an aspect of the present invention, a method of controlling power of an electronic device having a multi-core includes confirming a load of an operating core and the number of executable tasks at a predetermined period determining whether the load of the operating core and the number of executable tasks meet a defined on/off condition of the multi-core, and controlling on/off of the multi-core when the load of the operating core and the number of executable tasks meet the defined on/off condition of the multi-core.

According to another aspect of the present invention, an apparatus for controlling power of an electronic device having a multi-core, includes a controller including a plurality of cores, a core controller configured to confirm a load of operating core of the plurality of cores and the number of executable tasks at a predetermined period, determine whether the load of the operating core and the number of executable tasks meet a defined on/off condition of the multi-core, and control on/off of the multi-core when the load of the operating core and the number of executable tasks meet the defined on/off condition of the multi-core.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Various embodiments of the present invention are described with reference to the accompanying drawings in detail. The same reference numbers are used throughout the drawings to refer to the same or like components. Detailed descriptions of well-known functions and structures are omitted to avoid obscuring the subject matter of the present invention.

The electronic device according to an embodiment of the present invention may be implemented as a terminal including a multi-core, including a Personal Digital Assistant (PDA), a smart phone, a tablet Personal Computer (PC), a Portable Multimedia Player (PMP), an electronic book terminal, a notebook PC, a netbook computer, and an Ultra Mobile Personal Computer (UMPC).

Figure 1:
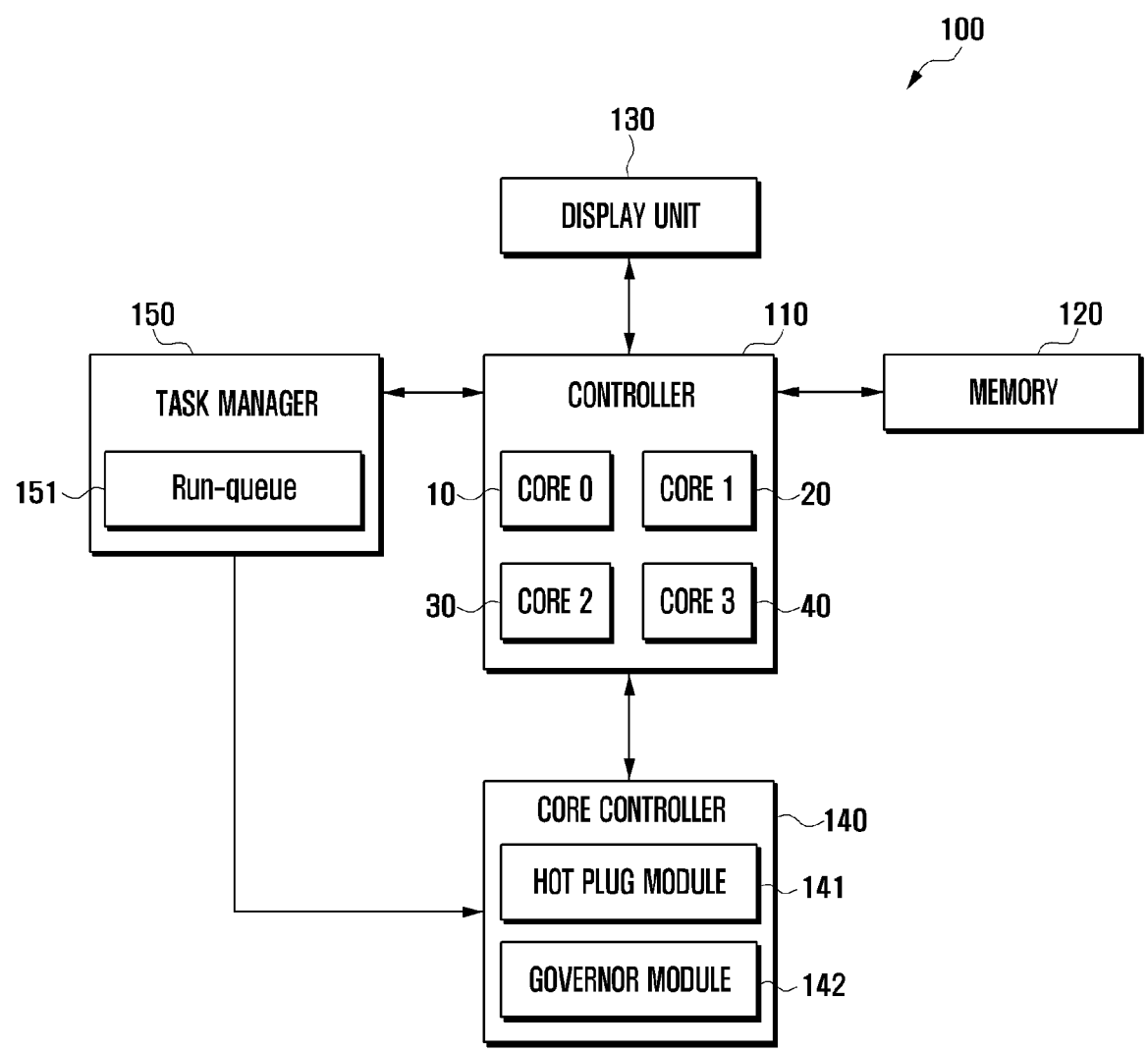
FIG. 1 is a block diagram illustrating a configuration of an electronic device including a multi-core, according to an embodiment of the present invention.
Figure 2:
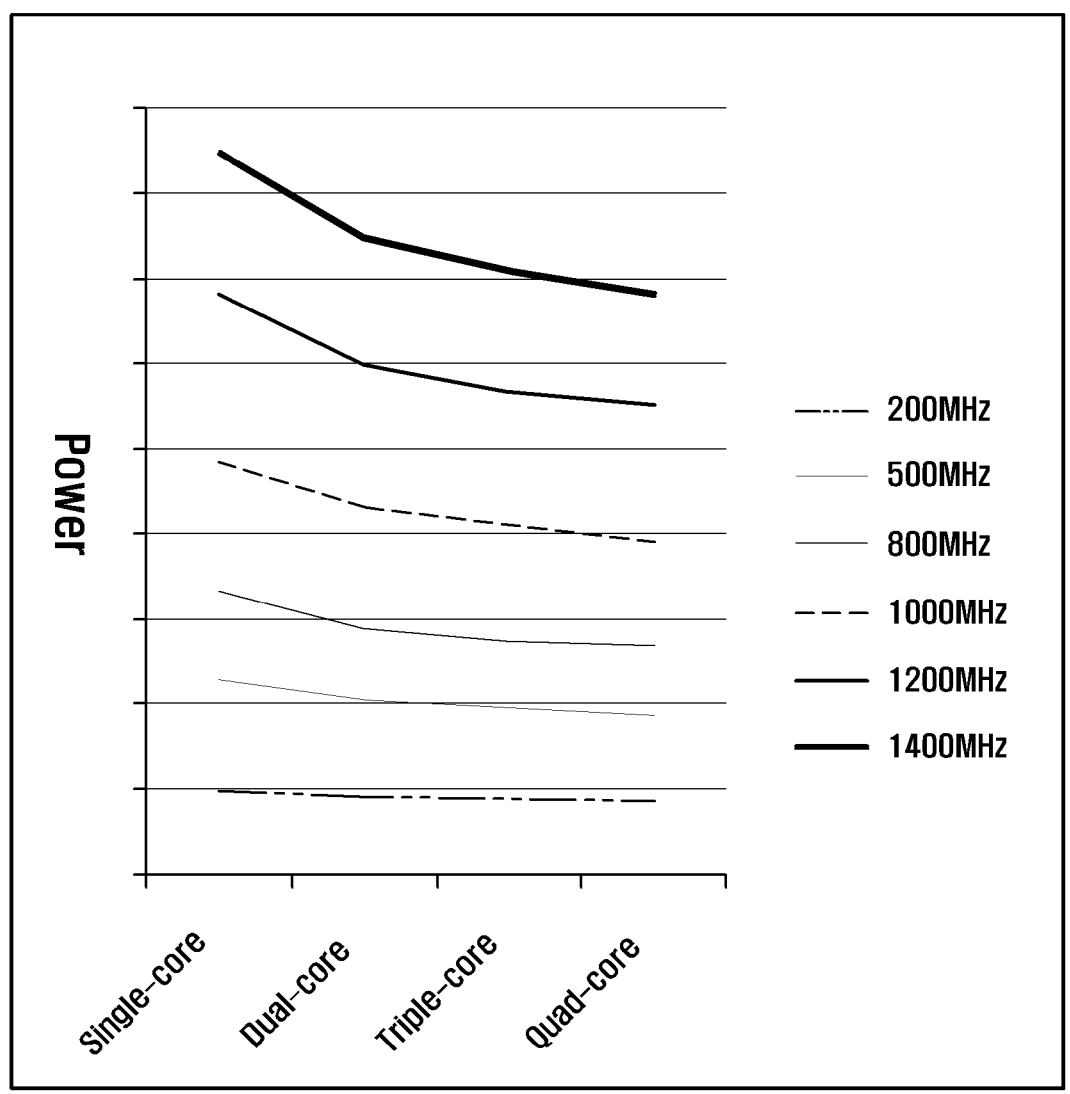
FIG. 2 is a graph illustrating current consumption characteristics of a multi-core, according to an embodiment of the present invention.
Figure 3:
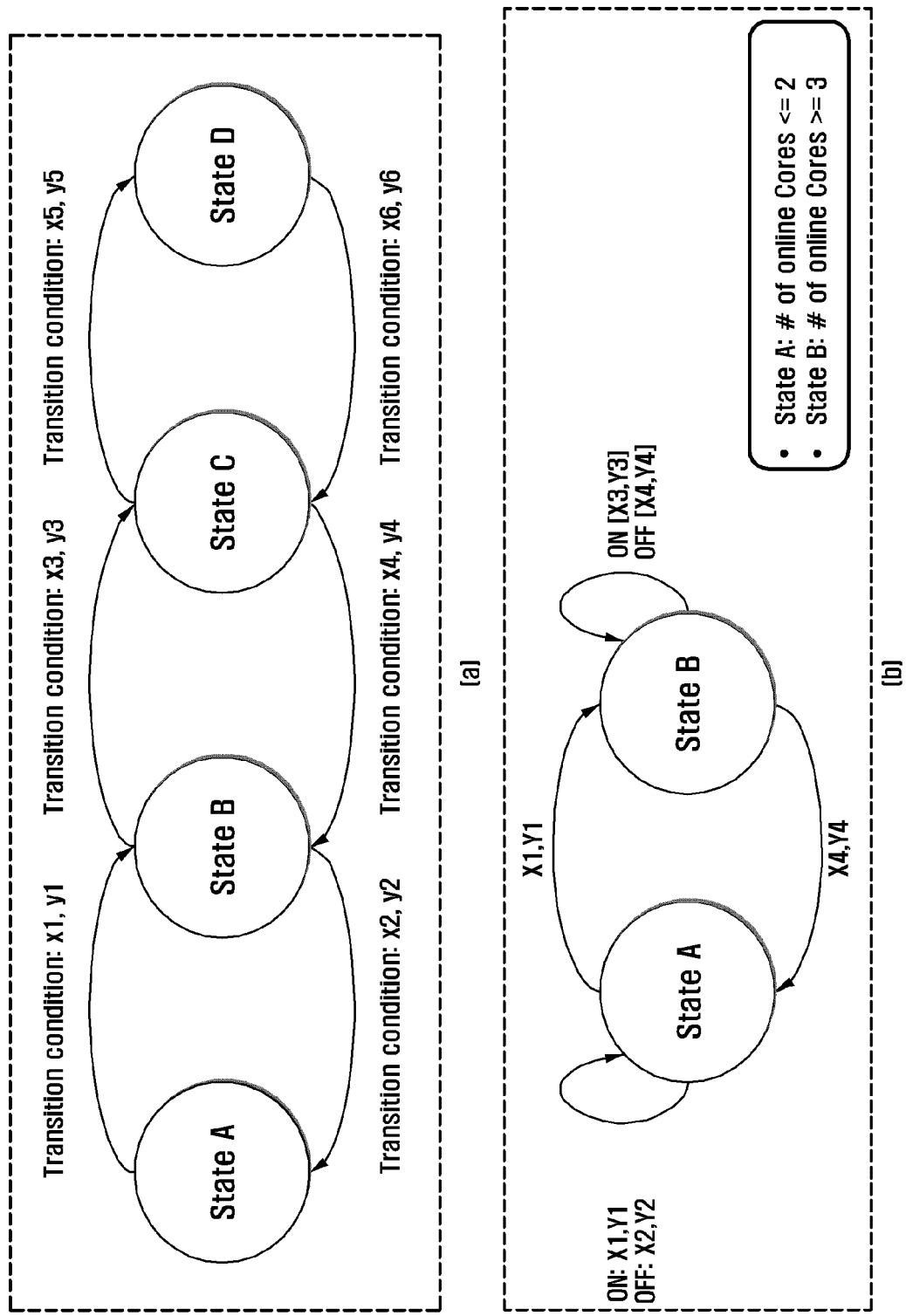
FIG. 3 is a diagram illustrating an on/off condition of a multi-core, according to an embodiment of the present invention.

FIG. 1 is a block diagram illustrating a configuration of an electronic device including a multi-core, according to an embodiment of the present invention, FIG. 2 is a graph illustrating current consumption characteristics of the multi-core, and FIG. 3 is a diagram illustrating an on/off condition of the multi-core according to an embodiment of the present invention.

The following description assumes that the electronic device according to the embodiment of the present invention includes quad-cores, as one example, but is not limited thereto, and is applicable to an electronic device including a plurality of cores.

Referring to FIGS. 1 to 3, the electronic device 100 according to an embodiment of the present invention includes a controller 110, a memory 120, a display unit 130, a core controller 140, and a task manager 150. The core controller 140 includes a hot-plug module 141 and a governor module 142, the task manager 150 includes a run-queue 151, and the controller 110 includes fourth cores 10, 20, 30, and 40.

The display unit 130 displays informing input by the user or information provided to the user as well as various menus. That is, the display unit 130 provides various screens, for example, an idle screen (home screen), a menu screen, a message creation screen, a call screen, a schedule managing screen, an address book screen, and a web page output screen. The display unit 130 is configured by a Liquid Crystal Display (LCD), an Organic Light Emitted Diode (OLED), or an Active Matrix Organic Light Emitted Diode (AMOLED). When the display unit 130 is configured in the form of a touch screen, the display unit 130 performs a function of an input unit (not shown).

The task manager 150 is a device for managing tasks whose execution is requested, and includes a run-queue 151 for temporarily storing the tasks whose execution is requested. The tasks stored in the run-queue 151 are processed by a core in an ON state of the cores 10, 20, 30, and 40 according to scheduling of a scheduler (not shown). For example, when only one core is in the on state, the tasks are sequentially processed by the one core. When a plurality of cores is in ON state, the tasks are simultaneously processed by the cores. Specifically, the task manager 150 according to an aspect of the present invention transmits the number of executable tasks in the run-queue 151 to the core controller 140 every predetermined time. In this case, the task manager 150 transmits the average number of tasks for the predetermined time to the core controller 140.

The core controller 140 controls on/off of the multi-core 10, 20, 30, and 40. The core controller 140 confirms a used amount (load) of the operating core and the number of executable tasks for execution at a predetermined period.

When the used amount (load) of the operating core and the number of executable tasks for execution meet an on/off condition (reference value) of a defined multi-core, the core controller 140 controls on/off of the multi-core. For example, when the load of the operating core and the number of executable tasks for execution become greater than a core ON reference value (ON Threshold) to request ON of an additional core, the core controller 140 turns on at least one of cores in an OFF state. In this case, the core controller 140 may simultaneously or sequentially turn on at least one core according to the number of parallel processable tasks. The core controller 140 turns on the core in an order of number or in a random order.

Conversely, when the load of the core and the number of executable tasks for execution become less than a core OFF reference value (OFF Threshold) to request OFF of a core, the core controller 140 turns off at least one of cores in an ON state. In this case, the core controller 140 turns off the cores from a core having the lowest load. When an OFF of a plurality of cores is requested, the core controller 140 may simultaneously or sequentially turn off the cores. When the OFF of the cores is requested, it is preferable that the core controller 140 prevents performance from being rapidly deteriorated and prevent generation of a load in remaining cores, and sequentially turns off the cores one by one to minimize performance reduction.

The on/off condition (reference value) of the multi-core according to an aspect of the present invention is set depending on a state of the multi-core. The state of the multi-core is classified according to current consumption characteristics of the multi-core. Referring to FIG. 2 illustrating the current consumption characteristics of the multi-core, assuming that the multi-core operates at the same frequency and process the same task, when separately processing the task by a plurality of cores, power consumption is reduced. However, core increase and a current reduced amount are linearly proportional to each other.

According to an aspect of the present invention, the state of the multi-core is classified in consideration of current consumption characteristics of the multi-core. For example, as illustrated in FIG. 3(a), a state where one core is on is defined as a 'state A', a state where two cores are on is defined as a 'state B', a state where three cores are on is defined as a 'state C', and a state where four cores are on is defined as a 'state D'. The present invention may classify the state of the multi-core into two as illustrated in FIG. 3(b). That is, a state where one or two cores are on is defined as a 'state A', a state where three or four cores are on is defined as a 'state B'. However, the present invention is not limited thereto. The state of the multi-core is defined according to current consumption characteristics or intention of a designer. For example, a state where one core is on is defined as a 'state A', a state where two to four cores are ON is defined as a 'state B'. The state of the multi-core is divided into three states. That is, a state where one core is on is defined as a 'state A', a state where two or three cores are on is defined as a 'state B', and a state where four cores are on is defined as a 'state C'.

As illustrated above, in consideration of current consumption characteristics of the multi-core, when the state of the multi-core is classified into a plurality of states, an on/off condition of the multi-core is set according to respective states. For example, as illustrated in FIG. 3(a), when the state of the multi-core is classified into four states, the on/off condition of the multi-core includes a first reference (X1, Y1) for transitioning the state of the multi-core from 'state A' to 'state B', a second reference (X2, Y2) for transitioning the state of the multi-core from 'state B' to 'state A', a third reference (X3, Y3) for transitioning the state of the multi-core from 'state B' to 'state C', a fourth reference (X4, Y4) for transitioning the state of the multi-core from 'state C' to 'state B', a fifth reference (X5, Y5) for transitioning the state of the multi-core from 'state C' to 'state D', and a sixth reference (X6, Y6) for transitioning the state of the multi-core from 'state D' to 'state C'. An X component of the on/off condition of the multi-core refers to a load of the core, and a Y component of the on/off condition refers to the number of executable tasks for execution. For example, when an ON reference of the multi-core is (60, 3.2), the core controller 140 additionally turns on the core when a load of the core is 60 or higher and the number of tasks is 3.2 or greater. When the off condition of the multi-core is (40, 2.2), the core controller 140 turns off one of cores in an ON state when the load of the core is 40 or less and the number of tasks is 2.2 or smaller. As illustrated FIG. 3(b), when the state of the multi-core is classified into two states, the on/off condition of the multi-core includes a first reference (X1, Y1) for additionally turning on the core in a 'state A' or transitioning the state of the multi-core from 'state A' to 'state B', a second reference (X2, Y2) for turning off the core in a 'state A', a third reference (X3, Y3) for additionally turning on the core in the 'state B', and a fourth reference (X4, Y4) for turning off the core or transitioning the state of the multi-core from the 'state B' to the 'state A'. In this case, it is preferable that the third reference (X3, Y3) has a value greater than that of the first reference (X1, Y1). This is performed to prevent current consumption due to unnecessary ON status of the core from being increased because a current consumption amount is not large when the number of cores is increased to four from three.

To perform the foregoing method of controlling on/off of the multi-core, the core controller 140 includes a hot-plug module 141. That is, the hot-plug module 141 controls on/off of the multi-core based on the load of the cores and the number of executable tasks. The optimal foregoing on/off condition of the multi-core depends on design preferences.

The core controller 140 includes a governor module 142. The governor module 142 changes an operation frequency of a core according to the load of the core. For example, when the load of the core is high, the governor module 142 increases the operation frequency of the core gradually or to a maximum value. When the load of the core is low, the governor module 142 gradually reduces the operation frequency of the core. The governor module 142 uses a Dynamic Voltage and Frequency Scaling (DVFS) governor.

When the operation frequency of the core is changed, the core controller 140 determines whether the operation frequency of the operating core is greater than or equal to a preset reference value when core ON is requested. As the determination result, when the operation frequency of the operating core is greater than or equal to the reference value, the core controller 140 additionally turns on at least one core in which the ON is requested. When the operation frequency of the operating core is less than the reference value, the core controller 140 maintains a current core state without turning on an additional core.

When core OFF is requested, the core controller 140 determines whether the operation frequency of the operating core is greater than or equal to the preset reference value. As the determination result, when the operation frequency of the operating core is less than the reference value, the core controller 140 turns off the operating core in which the OFF is requested. When the operation frequency of the core is greater than or equal to the reference value, the core controller 140 maintains a current core state without turning off the operating core. This is performed to prevent overhead due to on/off of the core from occurring. For example, when the core is turned off in a state that the core operates at a maximum operation frequency, a load of a core which is not turned off is rapidly increased to directly satisfy a core ON reference value so that a core ON request is directly generated. When the core is turned on in a state that the operation frequency of the core is low, a load of cores in an ON state is further reduced to satisfy a core OFF reference value so that a core OFF request is directly generated. As described above, when on/off of the core is frequently generated, system overhead is generated. The generation of the overhead will be described in detail with reference to FIGS. 6 and 7.

As described above, the hot plug module 141 is an independent module, but the hot plug module 141 is integrated with the governor module 142. As described above, when the hot plug module 141 is integrated with the governor module 142, the on/off condition of the multi-core is replaced as an operation frequency of an operating core corresponding to a load of the operating core. That is, the core controller 140 controls on/off of the multi-core based on the operation frequency of the core and the number of executable tasks.

The memory 120 stores an operating system (OS) of the electronic device 100, application programs necessary for other options functions, for example, a voice playback function, an image or moving image playback function, and a broadcasting playback function, user data and data transceived during communication. For instance, the memory 120 stores a moving image file, a game file, a music file, and a movie file. Specifically, the memory 120 according to an aspect of the present invention stores an on/off condition of the multi-core. The on/off condition is illustrated in Table 1 below.

TABLE 1

| Core state | Load of core (%) | Number of tasks |
|---|---|---|
| 1 -> 2 | X1(60) | Y1(1.5) |
| 1 <- 2 | X2(30) | Y2(2.0) |
| 2 -> 3 | X3(70) | Y3(2.5) |
| 2 <- 3 | X4(50) | Y4(2.5) |
| 3 -> 4 | X5(80) | Y5(3.5) |
| 3 <- 4 | X6(60) | Y6(3.0) |

Referring to Table 1, on/off of a core is controlled according to the load of the core and the number of tasks. For example, when the load of the core is 60% or greater and the number of tasks is 1.5 or greater in a state that one core is turned on, a second core is turned on. When the load of the core is 70% or greater and the number of tasks is 2.5 or greater in a state that two cores are turned on, a third core is turned on. When the load of the core is 80% or greater and the number of tasks is 3.5 or greater in a state that three cores are turned on, a fourth core is turned on. Similarly, the core is turned off according to a load of the core and the number of tasks.

The memory 120 stores a DVFS table. The DVFS table is a table in which the operation frequency of the core is mapped to the load of the core. The memory 120 stores a reference frequency for preventing frequent on/off the core. For example, the reference frequency is set to 70% of a maximum operation frequency. However, the present invention is not limited thereto. That is, the reference frequency is set according to the DVFS table and current consumption characteristics, and optimized based on design preferences. The memory 120 stores an operation period (sampling period) of the core controller 140. The operation period includes a core ON period for confirming an ON of an additional core and a core OFF period for confirming an OFF of the operating core. If the OFF period of the core is the same in duration or a different duration from the ON period of the core, it is preferable that the OFF period of the core is of a significantly greater value than the ON period of the core. For example, the ON period of the core may be 200 milliseconds (ms) and the OFF period of the core may be 5 s. However, the present invention is not limited to the above. This is performed to prevent frequent on/off of the core and to prevent the user from being dissatisfied with performance of the electronic device 100.

The controller 110 controls an overall operation of the electronic device and signal flow between internal blocks of the electronic device 100, and performs a data processing function for processing data. Specifically, the controller 110 according to the present invention includes a plurality of cores (e.g., quad cores 10, 20, 30, and 40). The controller 110 includes a Central Processing Unit (CPU), a Micro Processor Unit (MPU), and an Application Processor having a multi-core. The controller 110 controls at leas one core in an ON state of the quad cores 10, 20, 30, and 40 to process a task. Specifically, the controller 110 allocates executable tasks in the run queue 150 to the core in the on state.

Although not illustrated in FIG. 1, the electronic device 100 may further include constituent elements having additional functions such as a Global Positioning System (GPS) for receiving location information, a broadcast receiving module for receiving broadcast, a digital sound source playback module like an MP3 Module, and an Internet communication module executing Internet functions. Since the structural elements can be variously changed according to convergence trend of a digital device, no elements can be listed. However, the electronic device 100 includes structural elements equivalent to the foregoing structural elements.

Figure 4:
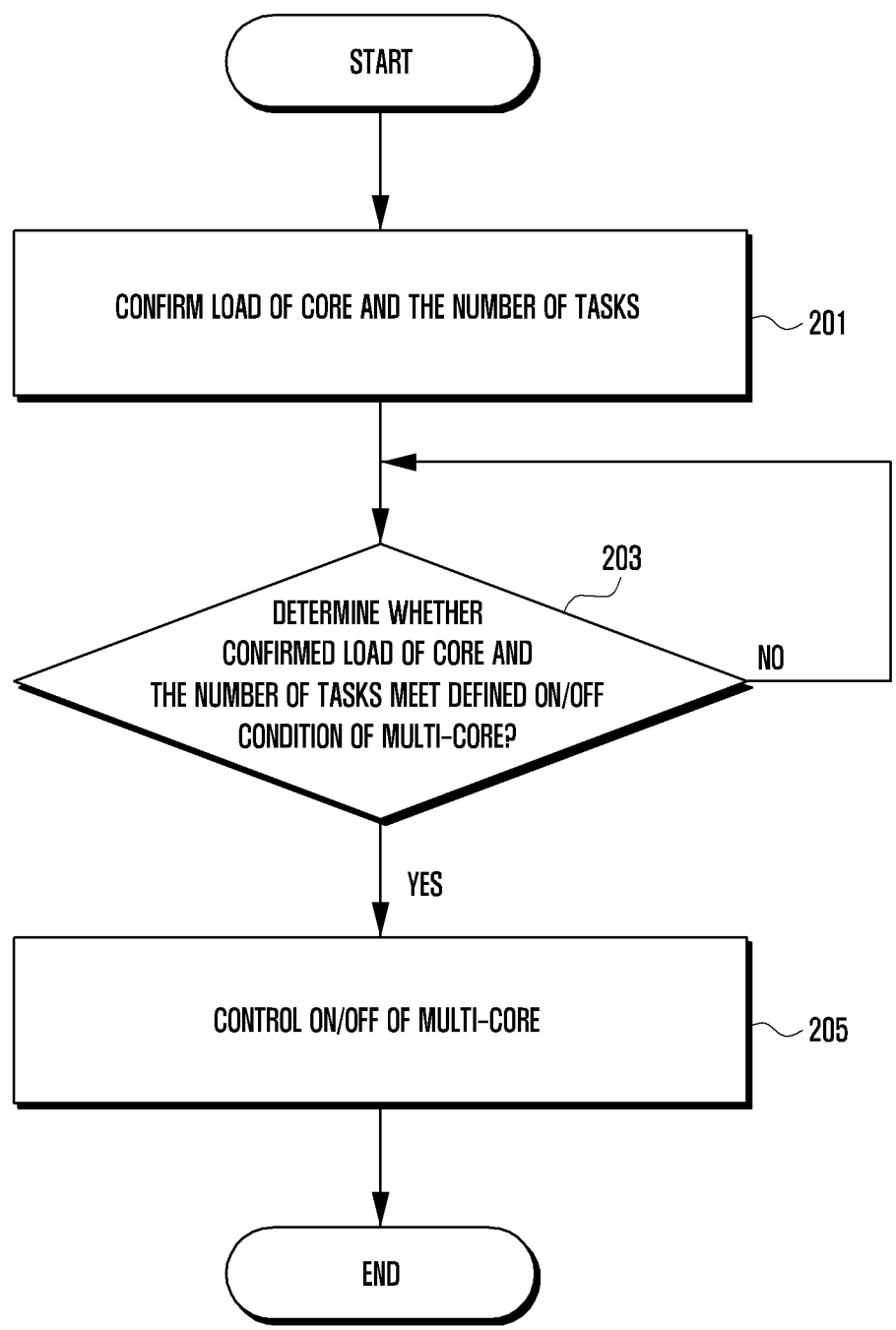
FIG. 4 is a flowchart illustrating a method of controlling power of an electronic device having a multi-core, according to an embodiment of the present invention.
Figure 5:
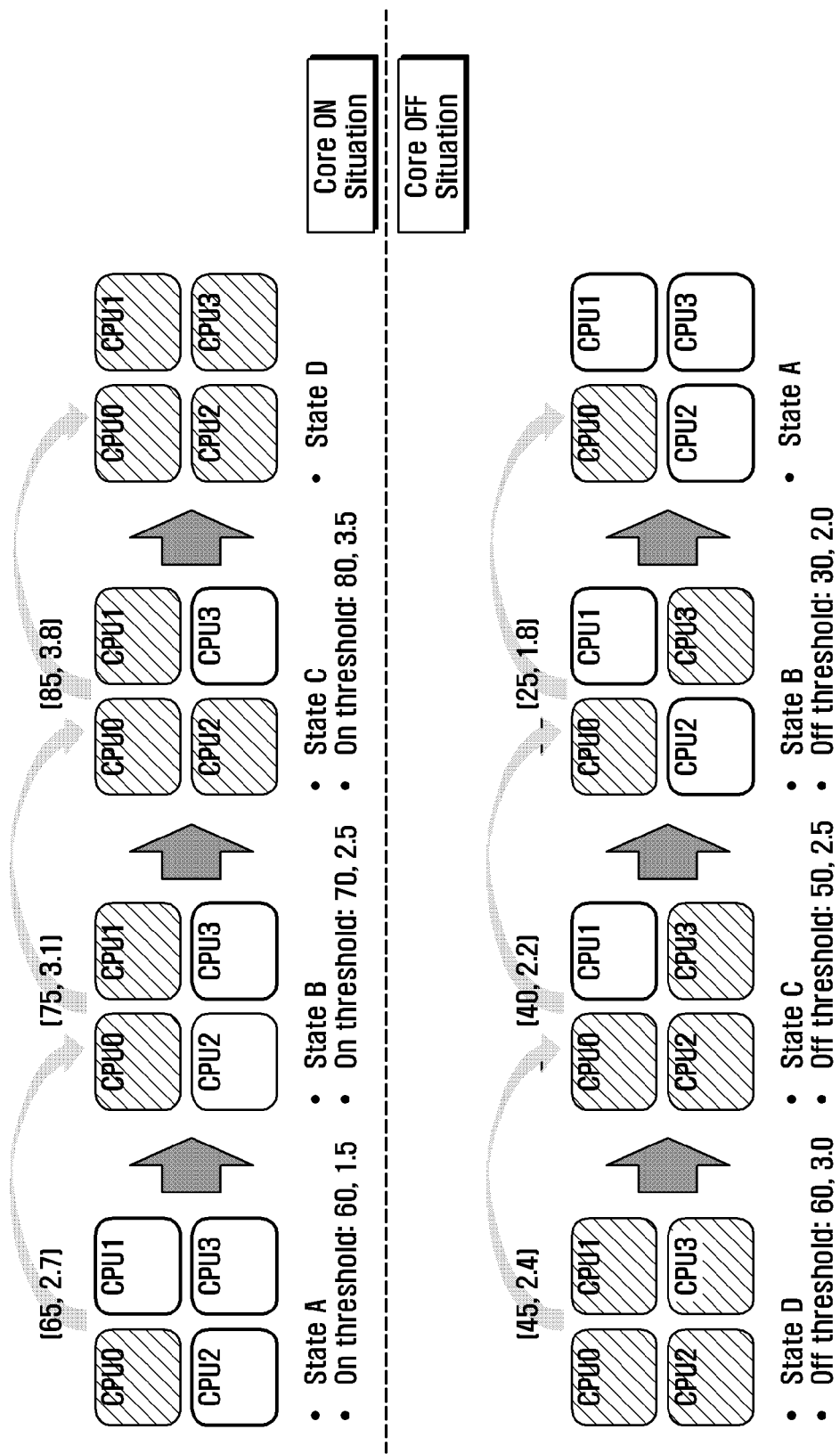
FIG. 5 is a diagram illustrating an example of a method of controlling power of an electronic device having a multi-core illustrated in FIG. 4, according to an embodiment of the present invention.

FIG. 4 is a flowchart illustrating a method of controlling power of an electronic device having a multi-core according to an embodiment of the present invention, and FIG. 5 is a diagram illustrating an example of the method of controlling power of an electronic device having a multi-core illustrated in FIG. 4.

Referring in particular to FIG. 4, a core controller 140 of an electronic device 100 according to the embodiment of the present invention confirms a load of a core and the number of tasks every predetermined period (core operation period) in step 201. The core operation period includes a core ON period for confirming an ON of an additional core and a core OFF period for confirming an OFF of the operating core. The OFF period of the core is the same in duration or a different duration from the ON period of the core. In this case, it is preferable that the OFF period of the core is greater than the ON period of the core.

The core controller 140 determines whether the load of the core and the number of the tasks confirmed meet a defined on/off condition of multi-core in step 203. As illustrated in FIG. 3, the on/off condition of the multi-core is set according to a state of the multi-core.

When the load of the core and the number of the tasks confirmed do not meet defined multi-core an on/off condition, the core controller 140 maintains step 203. Conversely, when the load of the core and the number of the tasks confirmed meet the defined on/off condition of the multi-core, the core controller 140 controls on/off of the multi-core in step 205. For instance, when the load of the core and the number of executable tasks for execution are greater than a core ON reference value (ON threshold) so that ON of the core is requested, the core controller 140 turns on at least one of cores in an OFF state. Conversely, when the load of the core and the number of executable tasks for execution are less than or equal to a core OFF reference value (OFF threshold) so that OFF of the core is requested, the core controller 140 turns off at least one of cores in an ON state.

This will be described with reference to FIG. 5. The following is a situation in which the core is turned on. Referring to Table 1, a core ON condition of a 'state A' is [60, 1.5]. If the load of the core and the number of tasks in the 'state A' is increased to [65, 2.7], because the case where [65, 2.7] meets the core ON condition in the 'state A', the core controller 140 turns on a second core CPU1. That is, the multi-core is transitioned to a 'state B' and the core ON condition is changed to [70, 2.5]. If the load of the core and the number of tasks in the 'state B' is increased to [75, 3.1], because the case where [75, 3.1] meets the core ON condition in the 'state B', the core controller 140 turns on a third core CPU2. That is, the multi-core is transitioned to a 'state C' and the core ON condition is changed to [80, 3.5]. If the load of the core and the number of tasks in the 'state C' is increased to [85, 3.8], because the case where [85, 3.8] meets the core ON condition in the 'state C', the core controller 140 turns on a fourth core CPU3. That is, the multi-core is transitioned to a 'state D'. As described above, the cores are sequentially turned on, but the present invention is not limited thereto. For example, if the load of the core and the number of tasks in the 'state A' is increased to [75, 3.1], because the case where [75, 3.1] corresponds to 'state C', the core controller 140 simultaneously turns on the second core CPU1 and the third core CPU2. As described above, the cores are turned on in an order of numbers, but the present invention is not limited thereto. That is, the cores are randomly turned on in another embodiment of the present invention.

The following is a situation in which the core is turned off. The core OFF condition in a 'state D' is [60, 3.0]. If the load of the core and the number of tasks in the 'state D' is reduced to [45, 2.4], because the case where [45, 2.4] meets the core OFF condition in the 'state D', the core controller 140 turns off the second core CPU1. That is, the multi-core is transitioned to a 'state C' and the core OFF condition is changed to [50, 2.5]. If the load of the core and the number of tasks in the 'state C' is reduced to [40, 2.2], because the case where [40, 2.2] meets the core OFF condition in the 'state C', the core controller 140 turns off the third core CPU2. That is, the multi-core is transitioned to a 'state B' and the core OFF condition is changed to [30, 2.0]. If the load of the core and the number of tasks in the 'state B' is reduced to [25, 1.8], because the case where [25, 1.8] meets the core OFF condition in the 'state B', the core controller 140 turns off the fourth core CPU3. That is, the multi-core is transitioned to a 'state A'.

Figure 6:
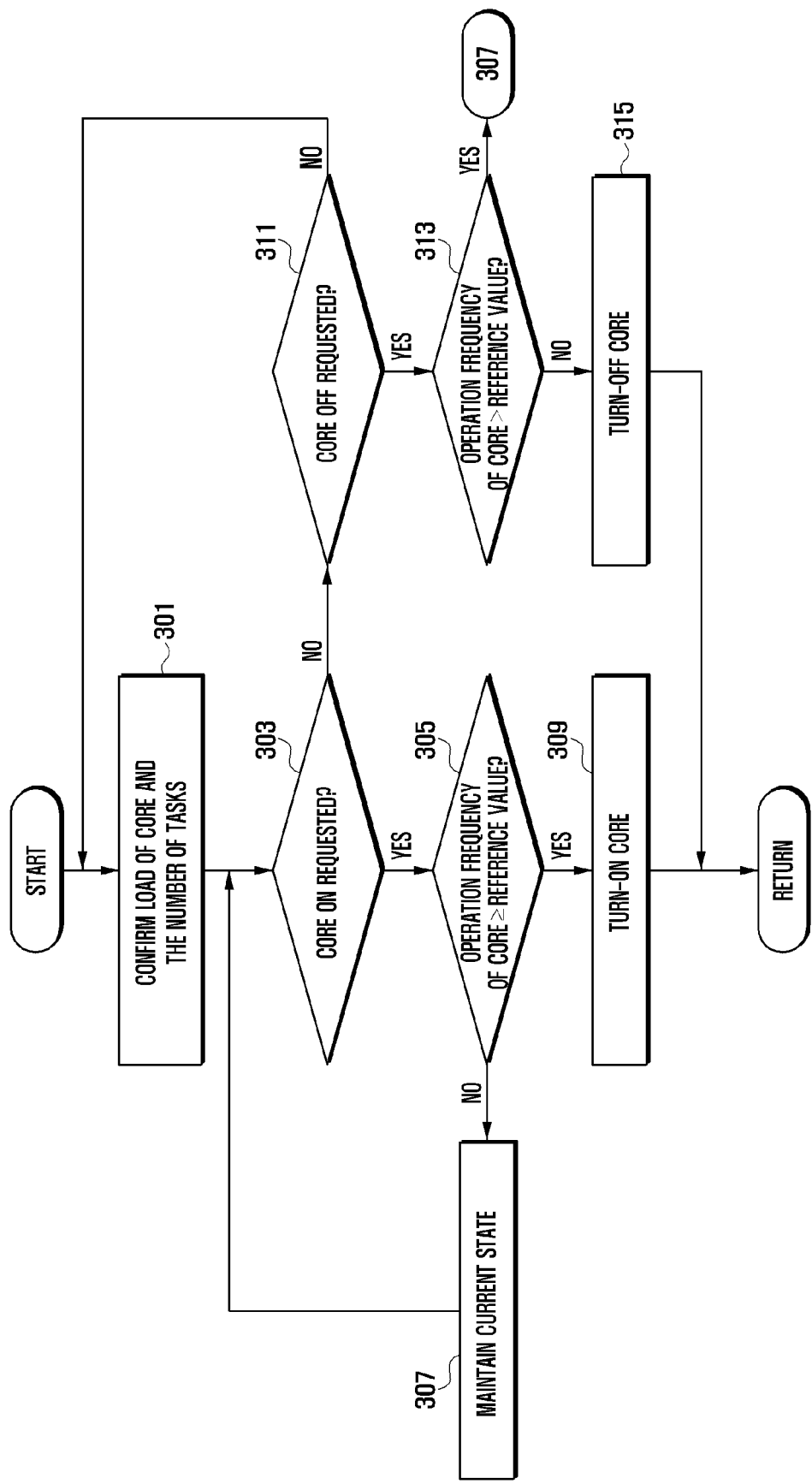
FIG. 6 is a flowchart illustrating a method of controlling power of an electronic device having a multi-core, according to an embodiment of the present invention.
Figure 7:
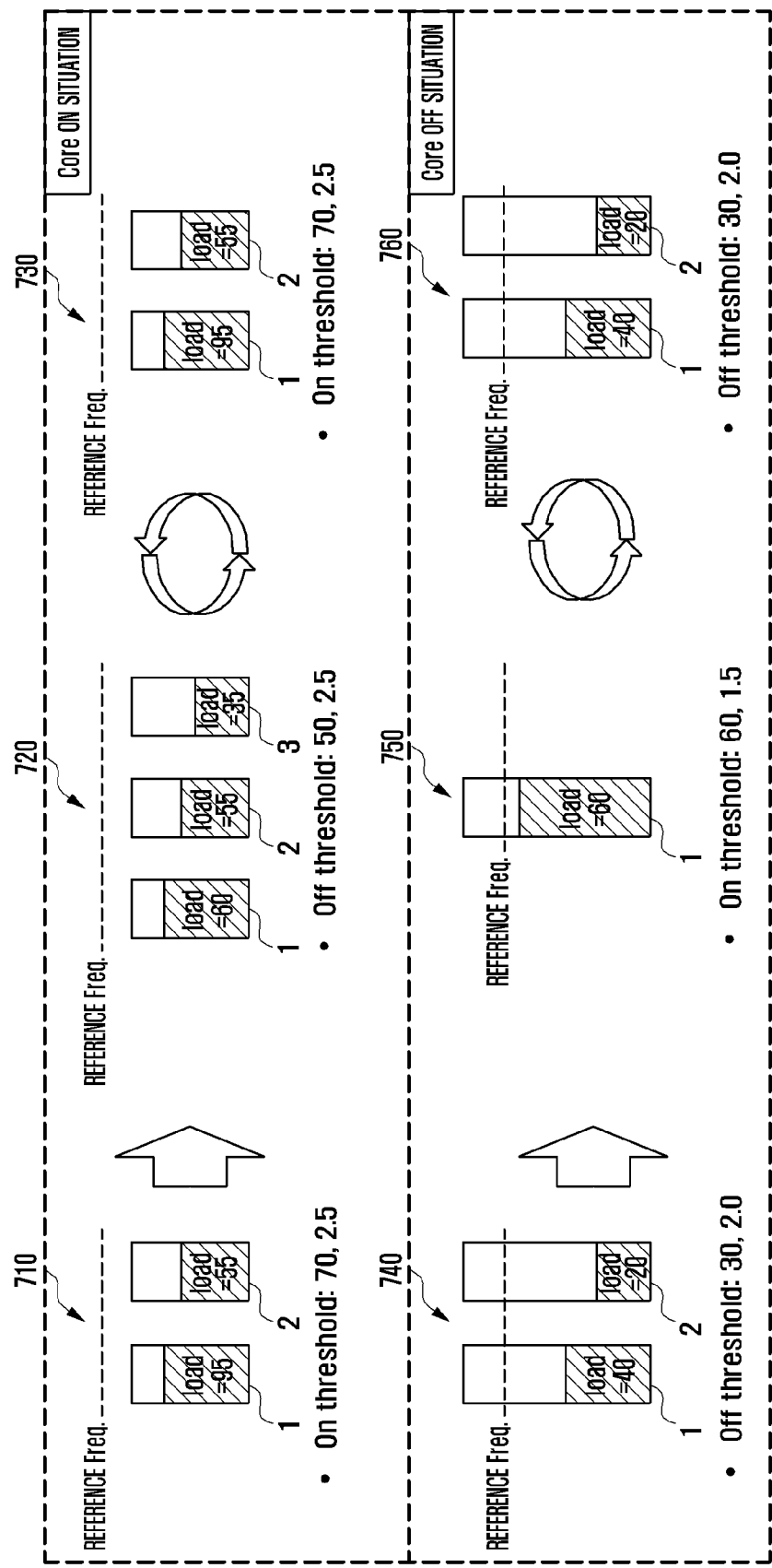
FIG. 7 is a diagram illustrating an example of the method of controlling power of an electronic device having a multi-core illustrated in FIG. 6, according to an embodiment of the present invention.

FIG. 6 is a flowchart illustrating a method of controlling power of an electronic device having a multi-core according to an embodiment of the present invention, and FIG. 7 is a diagram illustrating an example of the method of controlling power of an electronic device having a multi-core illustrated in FIG. 6.

Referring in particular to FIG. 6, a core controller 140 of an electronic device 100 confirms a load of a core and the number of tasks every predetermined period (core operation period) in step 301.

The core operation period includes a core ON period for confirming an ON of an additional core and a core OFF period for confirming an OFF of the operating core. The OFF period of the core is the same in duration or a different duration from the ON period of the core. In this case, it is preferable that the OFF period of the core is greater than the ON period of the core.

The core controller 140 determines whether core ON is requested in step 303. When the core ON is requested at step 303, the controller 110 determines whether an operation frequency of the core is greater than or equal to a preset reference value in step 305. When the operation frequency of the core is greater than or equal to the preset reference frequency, the core controller 140 turns on the core in step 309. Conversely, when the operation frequency of the core is less than the preset reference value, the core controller 140 maintains a current state in step 307. This is performed to prevent the core from being unnecessarily turned on/off. Referring to FIG. 7, as illustrated in reference numeral 710, when an average load of a core satisfies a core ON condition in a state that the first core 1 and the second core 2 are in an ON state and an operation frequency of the core is less than or equal to a reference frequency, the core controller 140 turns on a third core 3 as illustrated in reference numeral 720.

If the third core 3 is turned on, the load of the first core 1 is reduced to '60' from '95', the second core 2 maintains a load of '55', and the third core 3 may have a load of '35'. An average load of the core in a state of reference numeral 720 satisfies a core OFF condition. Accordingly, the core controller 140 turns off a third core having a low load as shown in reference numeral 730. In a state of reference numeral 730, that is, when the third core 3 is turned off so that only the first core 1 and the second core 2 are turned on, because the average load of the core again satisfies a core ON condition, a core ON request is regenerated and the core controller 140 turns on the third core 3 according to the core ON request. In this case, the core is frequently turned on/off so that overhead may be generated. Accordingly, when the operation frequency of the core is lower than the reference frequency even if the core ON is requested, the controller 140 maintains a current state of the core until a next period, while not turning on.

Conversely, when core ON is not requested at step 303, the core controller 140 determines whether core OFF is requested in step 311. When the core OFF is not requested at step 311, the core controller 140 may return to step 301. Conversely, when the core OFF is requested at step 311, the core controller 140 determines whether the operation frequency of the core is greater than or equal to the reference frequency in step 313. When the operation frequency of the core is less than the reference frequency, the core controller 140 turns off the core in step 315. Conversely, when the operation frequency of the core is equal to or higher than the reference frequency, the core controller 140 maintains a current state in step 307. This is performed to prevent frequent on/off of the core. Referring to FIG. 7, as illustrated in reference numeral 740, when the operation frequency of the core satisfies a core OFF condition in a state that the first core 1 and the second core 2 are in an ON state and an operation frequency of the core exceeds the reference frequency, the core controller 140 turns off a second core 2 as illustrated in reference numeral 750.

If the second core 2 is turned off, a load of the first core 1 is increased to '60'. In a state of reference numeral 740, the first core 1 satisfies a core ON condition. Accordingly, the core controller 140 turns on the second core 2 as shown in reference numeral 760. Because the load of the core satisfies a core OFF condition in a state of reference numeral 740, a core OFF request is regenerated and the core controller 140 turns off the second core 2 according to the core OFF request. In this case, the core is frequently turned on/off so that overhead may be generated. Accordingly, when the operation frequency of the core is greater than or equal to the reference frequency even if the core OFF is requested, the controller 140 maintains a current state until a next period while not turning off the core.

As described above, on/off of the multi-core is controlled in integral consideration of a load of a core, the number of executable tasks, and an operation frequency of the core to reduce current consumption, may simultaneously turn on a plurality of cores in consideration of parallelism, and prevents overhead due to frequent on/off from being generated.

Figure 8:
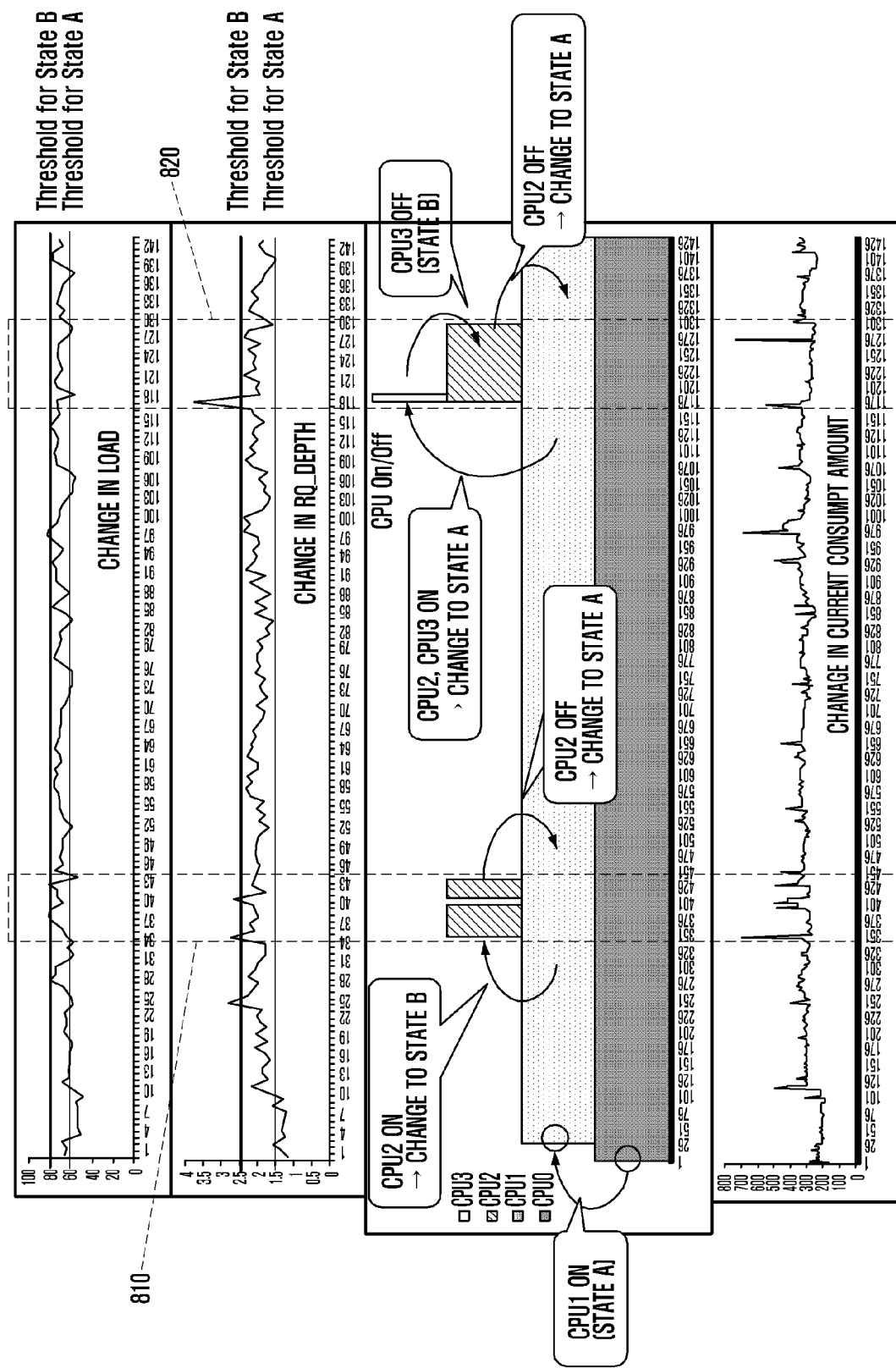
FIG. 8 is a graph illustrating state change of the multi-core and change in a power consumption amount of the electronic device according to the state change of the multi-core, according to an embodiment of the present invention.

FIG. 8 is a graph illustrating state change of the multi-core and change in a power consumption amount of the electronic device according to the state change of the multi-core according to an embodiment of the present invention. FIG. 8 illustrates a measured result when a state of a multi-core is classified into two states as illustrated in FIG. 3(b).

Referring to FIGS. 1 to 8, a load graph indicating change in a load of a core is located in a top and a task number graph indicating change of the number of tasks is at a bottom end of the load graph. A core state graph indicating an on/off state of the core is located at a bottom end of the task number graph. A current amount graph indicating change of a current consumption amount is located at a bottom end of the core state graph. The load graph and the number of tasks include a reference value corresponding to a 'state A' and a 'state B'.

Referring to reference numeral 810, as the load of the core and the number of tasks are increased, the third core CPU2 is turned on so that a state of the multi-core transitions from the 'state A' to the 'state B'. As the load of the core and the number of tasks are reduced, the third core CPU2 is turned off so that a state of the multi-core transits from the 'state B' to the 'state A'. Referring to reference numeral 820, as the load of the core and the number of tasks are rapidly increased, the third core CPU2 and the fourth core CPU3 are simultaneously turned on. As the load of the core and the number of tasks are reduced, the fourth core CPU3 and the third core CPU2 are sequentially turned off. As illustrated in FIG. 8, ON/OFF of the core is controlled according to change in the load of the core and the number of tasks. Accordingly, an aspect of present invention is to efficiently control current consumption of the electronic device.

Figure 9:
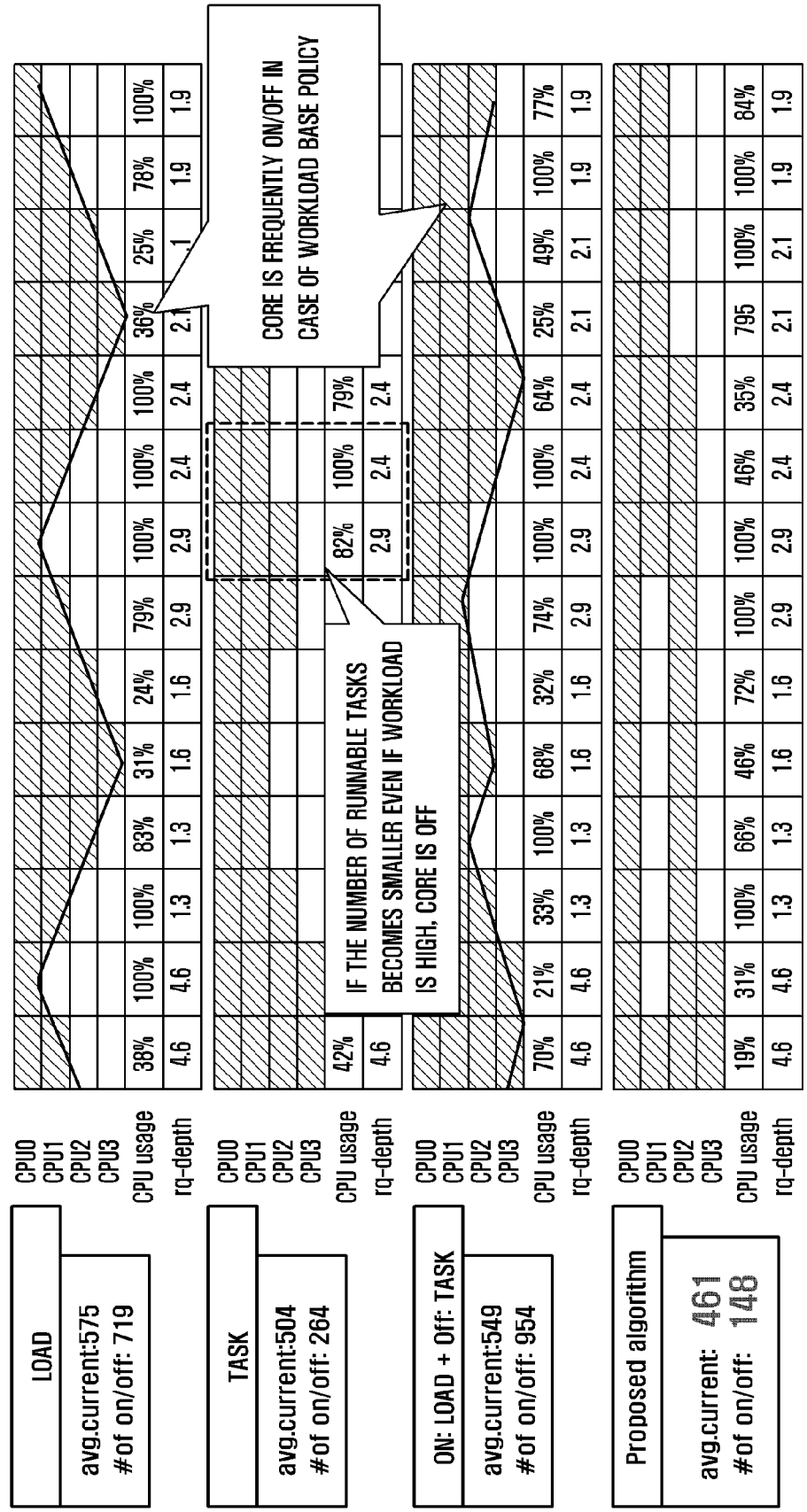
FIG. 9 is a graph illustrating a current consumption simulation result of the electronic device, according to an embodiment of the present invention.

FIG. 9 is a graph illustrating a current consumption simulation result of the electronic device according to an embodiment of the present invention.

Referring to FIG. 9, an average current consumption amount of an electronic device controlling ON/OFF of a core according to a load of the core is 575 mA, and the ON/OFF number is 719. That is, a core is frequently turned on/off in an electronic device for controlling ON/OFF of the core based on the load of the core, so that current consumption is high.

Further, an average current consumption amount of an electronic device for controlling ON/OFF of the core according to the number of tasks is 504 mA, and the ON/OFF number is 264. That is, even if the load of the core is high, if the number of executable tasks becomes small, because the core of the electronic device controlling ON/OFF of the core according to the number of tasks is turned off, the ON/OFF number of the core is increased. Overload occurs in remaining cores as the core is turned off in a state that the load is high, and current consumption is high due to the overload.

Moreover, an average current consumption amount of the electronic device for controlling ON of the core based on the load of the core and controlling OFF of the core based on the number of tasks is 549 mA, and the on/off number is 954. Moreover, current consumption amount of the electronic device for controlling ON of the core based on the load of the core and controlling OFF of the core based on the number of tasks is large and the on/off number of the core is very many.

A state of a multi-core according to an aspect of the present invention is classified into two states as illustrated in FIG. 3(b), an average current consumption amount of the electronic device for controlling on/off of the core according to the load of the core and the number of tasks is 461 mA, and the on/off number is 148.

As described above, when comparing an average power consumption amount and the on/off number of the core, a state of the multi-core is classified into at least two, the electronic device according to an aspect of the present invention for controlling the core according to the load of the core and the number of tasks has the lowest average current consumption and the core has the least on/off overhead.

The foregoing method for controlling power of an electronic device having a multi-core according to an aspect of the present invention may be implemented in an executable program command form by various computer means and be recorded in a computer readable recording medium. In this case, the computer readable recording medium includes a program command, a data file, and a data structure individually or a combination thereof. The program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, Random Access Memory (RAM), flash memory storing and executing program commands. Further, the program command includes a machine language code created by a compiler and a high-level language code executable by a computer using an interpreter. The foregoing hardware device may be configured to be operated as at least one software module to perform an operation according to an aspect of the present invention.

As described above, the method and the apparatus for controlling power of an electronic device including a multi-core according to the embodiment of the present invention minimizes performance reduction and power consumption by controlling on/off of the core in consideration of the load of the core and the number of executable tasks. That is, when the load of the core is increased, the necessary number of cores is simultaneously turned on in consideration of parallelism. When the load of the core is reduced, the core is turned off. Thus, current consumption of a multi-core processor is minimized.

The current consumption is minimized by setting a plurality of on/off reference values of the multi-core in consideration of current consumption characteristics of the multi-core processor. According to an aspect of the present invention, whether an operation frequency of the core is greater than or equal to a reference value is determined upon a core ON/OFF request to control on/off of the core, thereby preventing frequent generation of on/off. That is, the present invention can prevent overhead from being generated.

Although various embodiments of the present invention have been described in detail herein, it will be apparent to those of ordinary skill in the art that variations and modifications in form and detail may be made without departing from the spirit and scope of the present invention, as defined by the appended claims.

What is claimed is:

1. A method of controlling power of an electronic device having a multi-core, the method comprising:
    confirming a load of an operating core and the number of executable tasks at a predetermined period;
    changing an operation frequency of the operating core according to the load of the operating core; and
    controlling on/off of the multi-core if the load of the operating core and the number of executable tasks satisfy a defined on/off condition of the multi-core that is set according to current consumption characteristics of the multi-core,
    wherein controlling on/off of the multi-core comprises identifying whether a current operation frequency of the operating core is greater than or equal to a preset reference frequency if the defined on/off condition is satisfied, and
    wherein the predetermined period includes a core ON period for confirming an ON of an additional core and a core OFF period for confirming an OFF of the operating core.

2. The method of claim 1, wherein the defined on/off condition of the multi-core is set depending on states of the multi-core classified according to the current consumption characteristics of the multi-core.

3. The method of claim 1, wherein controlling the on/off of the multi-core comprises simultaneously turning on/off at least one core in consideration of parallel processing of the executable tasks.

4. The method of claim 3, wherein turning off the at least one core comprises sequentially turning off the at least one core from a core having a low load.

5. The method of claim 1, wherein the core OFF period differs from the core ON period.

6. The method of claim 1, further comprising:
    when ON of an additional core is requested and the operation frequency of the operating core is greater than or equal to the reference frequency, turning on the additional core in which the ON is requested; and
    when the operation frequency of the operating core is less than the reference frequency, maintaining a current state of the multi-core without turning on the additional core.

7. The method of claim 1, further comprising:
    when OFF of the operating core is requested and the operation frequency of the operating core is greater than or equal to the reference frequency, maintaining a current state of the multi-core without turning off the operating core in which the OFF is requested; and
    when the operation frequency of the operating core is less than the reference frequency, turning off the core in which the OFF is requested.

8. The method of claim 1, wherein the load of the operating core is replaced as an operation frequency of the core corresponding to the load of the operating core.

9. An apparatus for controlling power of an electronic device having a multi-core, the apparatus comprising:
    a controller configured including a plurality of cores;
    a core controller configured to confirm a load of an operating core of the plurality of cores and the number of executable tasks at a predetermined period, change an operation frequency of the operating core of the plurality of cores according to the load of the operating core, and control on/off of the multi-core if the load of the operating core and the number of executable tasks satisfy a defined on/off condition of the multi-core that is set according to current consumption characteristics of the multi-core, wherein the core controller identifies whether a current operation frequency of the operating core is greater than or equal to a preset reference frequency if the defined on/off condition is satisfied, and wherein the predetermined period includes a core ON period for confirming an ON of an additional core and a core OFF period for confirming an OFF of the operating core.

10. The apparatus of claim 9, further comprising a memory configured to store the defined on/off condition of the multi-core.

11. The apparatus of claim 9, wherein the defined on/off condition of the multi-core is set depending on states of the multi-core classified according to the current consumption characteristics of the multi-core.

12. The apparatus of claim 9, wherein the core controller simultaneously turns on/off at least one core in consideration of parallel processing of the executable tasks.

13. The apparatus of claim 9, wherein the core OFF period differs from the core ON period.

14. The apparatus of claim 9, when ON of an additional core is requested, turns on the additional core in which the ON is requested when the operation frequency of the operating core is greater than or equal to the reference frequency, and maintains a current state of the multi-core without turning on the additional core when the operation frequency of the core is less than the reference frequency.

15. The apparatus of claim 9, wherein the core controller when OFF of the operating core is requested, maintains a current state of the multi-core without turning off the operating core in which the OFF is requested when the operation frequency of the operating core is greater than or equal to the reference frequency, and turning off the operating core in which the OFF is requested when the operation frequency of the core is less than the reference frequency.

16. The apparatus of claim 9, wherein the core controller comprises a hot plug module for controlling on/off of the plurality of cores, and a governor module for controlling operation frequencies of the plurality of cores.

17. The apparatus of claim 16, wherein when the hot plug module is integrated with the governor module, the load of the operating core is replaced as an operation frequency of the operating core corresponding to the load of the operating core.

18. A non-transitory computer readable storage medium storing computer executable instructions causing, when executed, a processor in an electronic device, to:
    confirm a load of an operating core and the number of executable tasks at a predetermined period;
    change an operation frequency of the core according to the load of the operating core; and
    control on/off of the multi-core if the load of the operating core and the number of executable tasks satisfy a defined on/off condition of the multi-core that is set according to current consumption characteristics of the multi-core,
wherein control on/off of the multi-core comprises identifying whether a current operation frequency of the operating core is greater than or equal to a preset reference frequency if the defined on/off condition is satisfied, and
wherein the predetermined period includes a core ON period for confirming an ON of an additional core and a core OFF period for confirming an OFF of the operating core.

* * * * *